United States Patent Office 2,990,663
Patented July 4, 1961

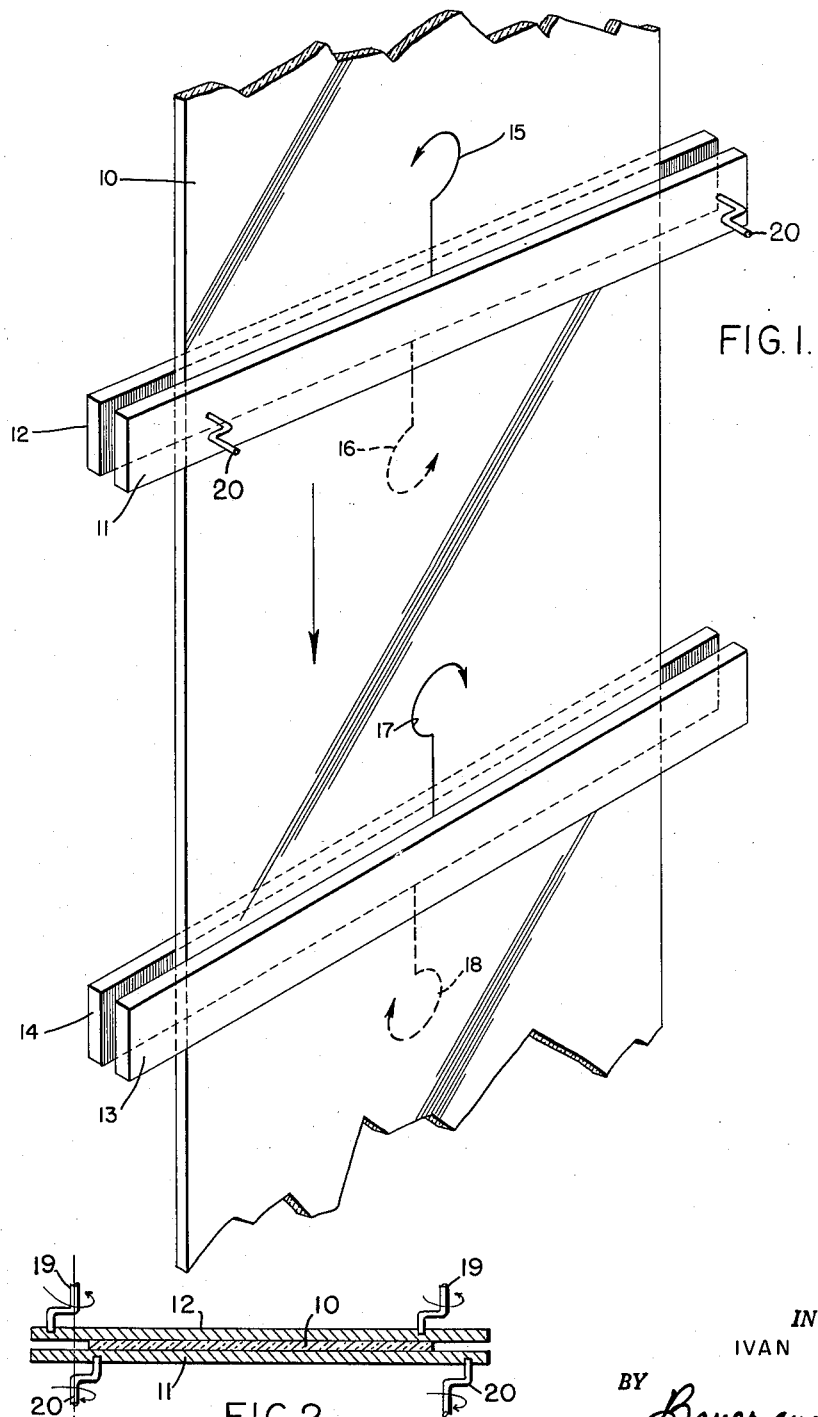

2,990,663
PROCESS FOR GRINDING OR POLISHING SIMULTANEOUSLY THE TWO FACES OF A GLASS SHEET
Ivan Peyches, Paris, France, assignor to Compagnie de Saint-Gobain, Paris, France
Filed Feb. 28, 1958, Ser. No. 718,159
Claims priority, application France Mar. 8, 1957
2 Claims. (Cl. 51—283)

The present invention relates to a process of grinding and/or polishing simultaneously the two faces of a glass sheet. This process is performed by means of pairs of moving surfacing tools situated on both sides of the glass sheet and exercising a rubbing action simultaneously on both faces of the sheet during its travel between the tools of each pair.

The invention relates more particularly to the process in which the two surfacing tools of a pair, that is to say the tools oppositely disposed on the two faces of the sheet, are each moved with periodical translatory movement along identical closed directing curves and with the same speed. The directing curve may be, in particular, circular and the movement may be obtained by means of two crank-shafts 19, 20 so that any two points of each tool describe equal circumferences, all the points of the rubbing surface of the tool describe thus in synchronism identical circumferences.

FIG. 1 is a diagrammatical plan view of apparatus embodying the invention.

FIG. 2 is a section on line 2—2 of FIG. 1.

If the periodical translatory movements transmitted to the tools of a same pair are synchronized in phase, these tools remain always face to face on the same perpendicular to the plane of the sheet without any shifting during their movements. In these conditions, the resultants of the actions of each tool on the glass sheet have, at every moment, the same direction and they add their effects. As a result the sheet is submitted to serious vibrations, successively in all directions, during each cycle of the tools.

If, on the other hand, the two tools of the same pair are displaced in opposite directions one to another symmetrically to the axis of travel of the glass sheet, the resultants of the rubbing forces exercised by each of the tools are combined into a general resultant directed along the axis of symmetry of the system, but with a constantly variable value. During every period of the movement, from a maximum in a direction to a maximum in the opposite direction, this value varies from maximum to maximum in passing through a zero value. In this case also the movement of the tools produces periodical vibrations capable of causing the breakage of the glass sheet. A period is, by dictionary definition, one complete revolution.

It is the object of the present invention to avoid these inconveniences by giving to the tools of a given pair identical periodical translatory motions, of the same direction but out of phase from each other by a half-period. Under these conditions the resultant of the friction exercised by a tool on a face of the sheet is, at any time, opposed to the resultant of friction exercised by the other tool on the other face of the sheet so that the effects of these resultants tend to be compensated and the vibrations of the sheet are greatly reduced.

If the rubbing surfaces of the two tools are of like form and the same dimensions, the frictional forces developed by each tool are the same, at any time, the only differences being the local variations of the abrasive supply or of the nature of the rubbing surfaces. As these resultants, practically identical, are, according to the invention, of opposite directions, it can be postulated that, disregarding the thickness of the glass sheet, they have a general resultant which is practically nul, reducing to a minimum the vibrations of the sheet.

According to the method of the invention, the balancing of the rubbing forces acting on both faces of the glass sheet nevertheless admits of a couple of rotation tending to turn the sheet in the direction of the periodical translatory movement of the pairs of tools.

This tendency is compensated for by giving opposite motions to successive pairs of tools. If the tools of a pair turn clockwise, the tools of the following pair turn counterclockwise, with the movements by the tools of each pair out of phase from each other of a half period, according to the present invention.

The figure of the drawing is a diagram representing the motions of a glass grinding machine operating according to this invention. In this figure, 10 is a sheet of glass proceeding in the direction of the arrow. A pair of grinder bars 11, 12 apply circular translatory motion to opposite sides of the sheet and another pair 13, 14 do the like. Means for driving the bars is shown at 19, 20, being known and in the nature of cranks and eccentrics.

According to the first phase of the invention bar 11 is driven counterclockwise and travels in the path indicated by arrow 15 while its companion of the pair 12 travels in the same direction but 180° out of phase as indicated by arrow 16.

According to the second phase of the invention the neighboring pair 13, 14 are driven 180° out of phase with respect to each other but in a clockwise direction, opposite to the direction of pair 11, 12.

It is to be understood that the case where the tool is near but not exactly out of phase by a half-period is also within the scope of the present invention.

What is claimed is:

1. A method of surfacing glass sheet simultaneously on both sides by means of tools which engage the sheet in oppositely arranged pairs and move with equal speed and translatory motion which comprises imparting to the tools of one opposed pair periodic translatory motion along closed paths in the same direction but out of phase with each other by about one half period, and imparting to the tools of an adjacent pair periodic translatory motion along closed paths in the direction opposite to that of the said one pair but out of phase with each other by about one half period.

2. A method of surfacing glass sheet simultaneously on both sides by means of tools which engage opposite sides of the sheet in the same place and move with translatory motion, which comprises imparting to the opposed tools periodic translatory motion along closed paths at the same speed in the same direction but out of phase with each other by about one half period.

References Cited in the file of this patent

UNITED STATES PATENTS

| | | |
|---|---|---|
| 1,962,766 | Crowley et al. | June 12, 1934 |
| 1,962,767 | Crowley et al. | June 12, 1934 |
| 2,705,853 | Laverdisse | Apr. 12, 1955 |